UNITED STATES PATENT OFFICE.

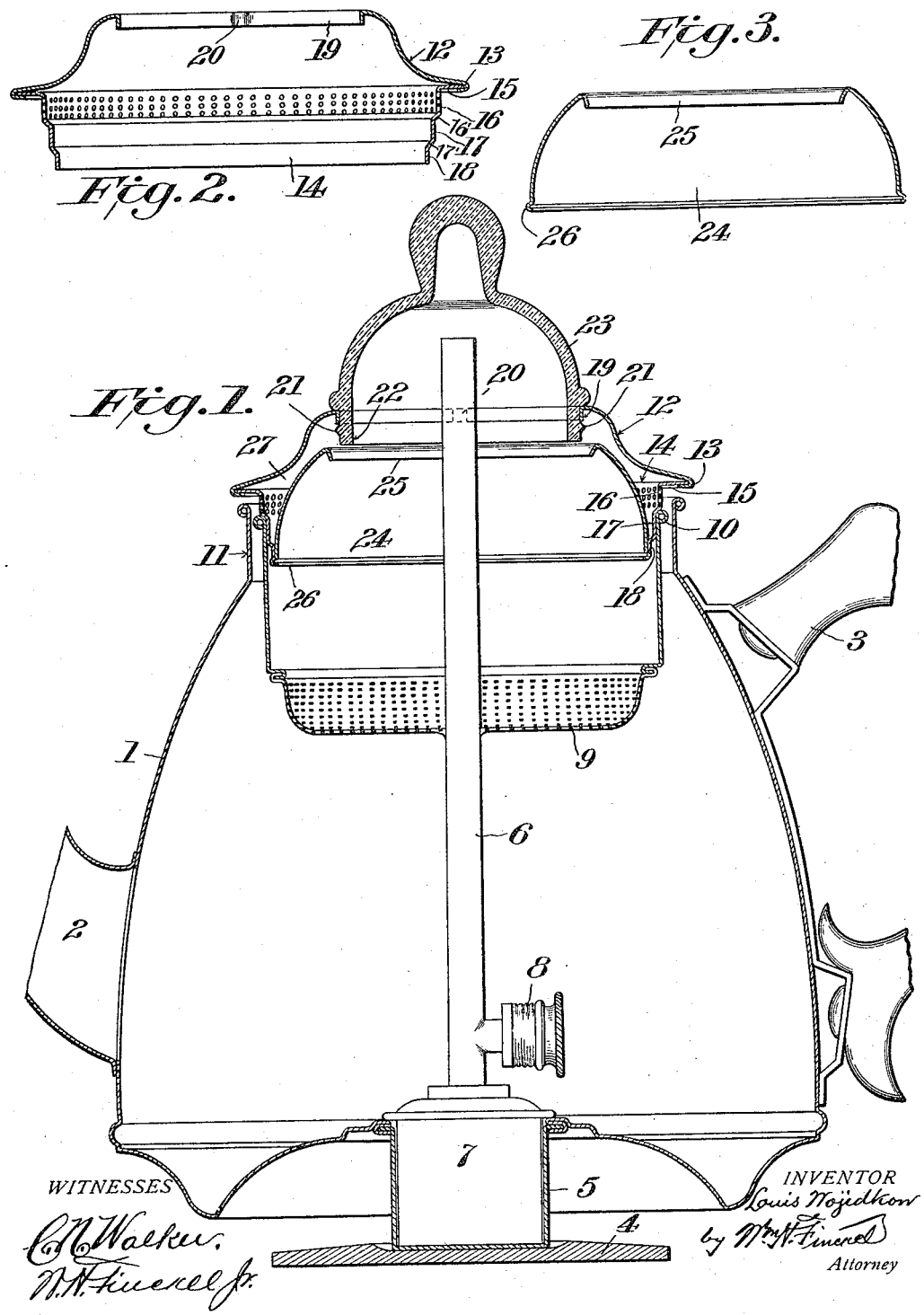

LOUIS WOJIDKOW, OF BROOKLYN, NEW YORK, ASSIGNOR TO NEW YORK STAMPING COMPANY, OF BROOKLYN, NEW YORK, A CORPORATION OF NEW YORK.

COFFEE-POT.

1,175,858.     Specification of Letters Patent.     Patented Mar. 14, 1916.

Application filed March 26, 1913. Serial No. 757,025.

*To all whom it may concern:*

Be it known that I, LOUIS WOJIDKOW, a citizen of the United States, residing at Brooklyn, in the county of Kings and State of New York, have invented a certain new and useful Improvement in Coffee-Pots, of which the following is a full, clear, and exact description.

This invention relates to coffee pots of the percolator type, and the object of the invention is to improve the circulation, and correct the spilling of the overflow.

In this invention, as in prior coffee pots of the same general type, is used a percolator tube, on which is mounted a foraminous cup to contain the ground coffee; but in the present invention this cup fits within the vessel so loosely as to provide a space between itself and the vessel sufficient to return the overflow during ebullition. As further distinguishing the present invention from the prior art, the overflow is located in the removable cover of the vessel, instead of being mounted in the foraminous cup and a peculiarly constructed retainer is similarly located.

The invention consists of the features just above described as distinguishing the present invention from the prior art, as I will proceed now to explain and finally claim.

In the accompanying drawings illustrating the invention, in the several figures of which like parts are similarly designated, Figure 1 is a vertical section of a coffee pot for use on a stove or lamp, the handle and the spout being broken off. Fig. 2 is a vertical section of a portion of the metallic part of the cover detached. Fig. 3 is a vertical section of the retainer detached.

The vessel 1 may be of any approved construction, and provided with a spout 2 and a suitable handle 3, a heating plate 4, a well 5, a percolator tube 6 having a plug 7 fitted in said well, and a circulation valve 8. On the percolator tube 6 is mounted, preferably permanently, although it may be otherwise mounted thereon, a foraminous cup 9, the upper portion of which may be solid and its edge 10 beaded substantially as shown and of enough smaller diameter than the inside of the neck 11 of the vessel 1 to leave a space between the two for the return into the body of the vessel of any overflow.

The cover comprises a metallic portion 12, having a lip or flange 13 overlying the neck of the vessel and preferably standing up from the upper edge of said neck so as to admit air between the cover and the neck of the vessel. Permanently applied to the cover portion 12 by its lip or flange 13 is a stepped flange 14, having the horizontal portion 15, the vertical perforated portion 16 which constitutes the overflow portion, the imperforate portion 17 and the imperforate portion 18, these three portions 16, 17 and 18 being of progressively smaller diameter, with the intervening shoulders 16' and 17'.

The upper portion of the cover 12 has a central opening provided with an inturned flange 19 notched as at 20 to receive corresponding lugs 21 on the flange 22 of the detachable glass cover portion 23. When the glass portion has its lugs passed down the notches 20, these lugs will extend below the edge of the flange 19 and then by turning the glass portion so that its lugs are out of alinement with the notches, the glass portion will be secured to the metal portion of the cover.

24 is a dome-shaped retainer, open at top and bottom and constructed of imperforate metal, having the reverted lip 25 surrounding the opening in its top, and also having the beaded bottom edge 26. This retainer is slipped into the metallic portion 12 of the cover by way of the bottom of such cover and it is held therein by frictional engagement with the step 18, its upper open end extending considerably above the perforated stepped portion 16 of the cover and into close approach to the glass portion of the cover, as indicated in Fig. 1, and in such relation to the cover as to leave a space 27 to receive any overflow and discharge it through the perforated portion 16, whence it returns into the vessel 1. The reverted lip 25 serves to arrest any coffee that may be thrown up by ebullition, and moreover admits of placing a large quantity of coffee in the foraminous cup 9 without danger of the solids boiling over into the vessel. The step 17 of the cover has a slip fit with the inside of the foraminous cup 9, as shown in Fig. 1; and as will be readily seen, when the cover is removed, it carries with it the overflow agent and the retainer, thus making access to the foraminous cup and its contents immediate and direct, and without requiring the removal of any additions to the cup, such as in the prior art.

By the principles of construction described, all of the parts are easily dismembered, and, hence, rendered accessible for cleansing purposes. Within these principles, as hereinafter claimed, the construction may be varied.

What I claim is:—

1. A coffee pot, of the percolator type, having a foraminous cup for containing the ground coffee, and a cover having a stepped flange as a permanent and fixed part thereof, one portion of said flange adapted to engage the cup and thereby support the cover thereon, and another portion located above such supporting portion and of larger diameter than the supporting portion and perforated to operate as an overflow and of smaller diameter than the neck of the pot so as to discharge into the pot, and having a laterally extending lip or flange overlying the neck of the pot above the overflow, the supporting portion serving to locate the perforated portion above the edge of the pot.

2. A coffee pot, of the percolator type, having a percolator tube, a foraminous cup supported on said tube, and a cover having a stepped flange depending from its upper portion and adapted to extend within the cup, and having its upper portion perforated to form an overflow for the cup and provided with a shoulder next below the perforated portion to support the cover upon the upper rim of such cup and expose the overflow above the cup so as to deliver the overflowing fluid free of the cup.

3. A coffee pot, of the percolator type, having a percolator tube, a foraminous cup supported on said tube, and a cover having a lateral flange at its top to overhang the mouth of the pot and a stepped flange extending downwardly from said lateral flange, the stepped portions being of downwardly decreasing diameter, the portion of greatest diameter being next the lateral flange and perforated and having a subjacent shoulder engaging the rim of the cup and supporting the cover with its perforated portion above the cup.

4. A coffee pot, of the percolator type, having a foraminous cup for containing the ground coffee, and a cover having a stepped flange as a permanent and fixed part thereof, one portion of said flange adapted to engage the cup and thereby support the cover thereon, and another portion located above such supporting portion and of larger diameter than the supporting portion and of smaller diameter than the neck of the pot and perforated to operate as an overflow, the supporting portion serving to locate the perforated portion above the edge of the coffee pot.

5. A coffee pot, of the percolator type, having a foraminous cup for containing the ground coffee, and a removable cover for the cup and coffee pot, said cover having as permanent parts thereof a rim for engaging the foraminous cup to support the cover and an overflow arranged above said supporting rim, combined with a dome-shaped retainer frictionally held in the cover at a point below the supporting rim and extending up into the cover above the overflow.

6. A coffee pot, of the percolator type, having a foraminous cup for containing the ground coffee, and a removable cover for the cup and coffee pot, constructed with a stepped flange having a portion for engaging the foraminous cup to support the cover, and a perforated overflow portion arranged above said supporting portion, and a dome-like retainer frictionally held in the cover at a point below its supporting portion and extending up into the cover above the overflow portion, said retainer having at its top an inverted flange.

7. A coffee pot, of the percolator type, having a percolator tube, a foraminous cup supported on said tube, and a cover having a depending stepped flange the intermediate portion of which has a slip fit within the cup, and a superposed shoulder resting upon the rim of the cup, and the upper portion located above and outside of the cup and perforated.

In testimony whereof I have hereunto set my hand this 24th day of March A. D. 1913.

LOUIS WOJIDKOW.

Witnesses:
 FRED S. WOJIDKOW,
 EDGAR H. HAZELWOOD.

Copies of this patent may be obtained for five cents each, by addressing the "Commissioner of Patents, Washington, D. C."